US005663863A

United States Patent [19]

Ohashi et al.

[11] Patent Number: 5,663,863

[45] Date of Patent: Sep. 2, 1997

[54] LINE ARRESTER

[75] Inventors: Takashi Ohashi, Kasugai; Tatsumi Ichioka, Kounan; Masamichi Ishihara, Aichi-ken; Toshiyuki Takagi, Komaki, all of Japan

[73] Assignees: The Tokyo Electric Power Co., Inc., Tokyo; NGK Insulators, Ltd., Nagoya, both of Japan

[21] Appl. No.: 550,998

[22] Filed: Oct. 31, 1995

Related U.S. Application Data

[63] Continuation of Ser. No. 856,785, Mar. 24, 1992, abandoned.

[30] Foreign Application Priority Data

Mar. 27, 1991 [JP] Japan .................................... 3-063349
Mar. 30, 1991 [JP] Japan .................................... 3-067483

[51] Int. Cl.[6] ........................................................ H02H 1/00

[52] U.S. Cl. .......................... 361/118; 361/127; 361/137; 361/138

[58] Field of Search ................................ 361/56, 91, 111, 361/118, 127, 40, 137, 138

[56] References Cited

U.S. PATENT DOCUMENTS 4,258,407 3/1981 Nagai ...................................... 361/117
4,725,917 2/1988 Mori et al. .............................. 361/132
4,761,707 8/1988 Wakamatsu et al. .................... 361/127

FOREIGN PATENT DOCUMENTS 0 406 099 A1 1/1991 European Pat. Off. ........ H01B 17/46
1-115018 5/1989 Japan .............................. H01B 17/46

OTHER PUBLICATIONS

Patent Abstract of Japan, vol. 3, No. 145, JP–A–54 124 244, Nov. 30, 1979.

Patent Abstract of Japan, vol. 14, No. 258, JP–A–20 67 969, Jun. 4, 1990.

*Primary Examiner*—Jeffrey A. Gaffin
*Assistant Examiner*—Stephen Jackson
*Attorney, Agent, or Firm*—Kubovcik & Kubovcik

[57] ABSTRACT

An improved line arrester is disclosed that includes a non-linear resistor. The arrester includes a pair of arcing horns are respectively provided on an earth side and a line side of the arrester, with an aerial discharge gap being provided therebetween. The aerial discharge gap is in electrical parallel with the resistor. The length of the aerial discharge gap is selected such that flashover does not occur in response to currents smaller than a rated discharge current of the resistor, yet flashover does occur in response to a current that is greater than the rated discharge current, but lower than a critical discharge current of the resistor. With this arrangement the resistor is protected against the lightning surge current greater than the critical discharge current.

21 Claims, 9 Drawing Sheets

LINE ARRESTER

This application is a continuation of application Ser. No. 07/856,785 filed Mar. 24, 1992, now abandoned.

This application claims the priorities of Japanese Patent Application Nos. 3-63349 and 3-67483 respectively filed on Mar. 27, 1991 and Mar. 30, 1991, which are incorporated herein by reference.

BACKGROUND OF THE INVENTION

1. Field of the Invention

The present invention generally relates to a line arrester for use in a support mechanism for a power transmission line (hereinafter referred to as "power line"). More particularly, this invention pertains to a line arrester which can promptly ground the surge current generated by lightning striking in the power line, and cut off the follow current to prevent ground failure.

2. Description of the Related Art

FIG. 1 shows a typical line arrester which supports a power line 50 in an insulated manner and absorbs any lightning surge currents generated by a lightning strike in the power line 50. This line arrester includes a metal upper hanger 52, a line arresting insulator string 53 and a metal lower hanger 54 by which the power line 50 is suspended from a tower arm 51. The line arresting insulator string 53 is constructed by linking multiple line arresting insulators 55 in series. The insulators 55 cope with the lightning surge current.

As shown in FIG. 2, a body (porcelain shell) 56 of each line arresting insulator 55 has a shed 55*a* with a pair of bore holes 56*c*, and a head 56*b* integrally formed on the center top portion of the shed 56*a*. A metal cap 57 is fixed to the top portion of the insulator head 56*b*, and a metal ball pin 58 is secured to the bottom portion of the head 56*b*.

A plurality of variable resistors (hereinafter referred to a "varistors") 59 are accommodated in each bore hole 56*c*. Each varistor 59 consists essentially of zinc oxide and has a non-linear voltage-current characteristic. The varistors 59 are retained in each bore hole 56*c* by an upper seal 60 and a lower seal 61, respectively attached to the upper and lower end sections of that bore hole 56*c*.

The upper seal 60 is connected via a bonding wire 62 to the cap 57, while the lower seal 61 is connected via a bonding wire 63 to the pin 58. The cap 57 is provided with arc guides 64 in association with the upper seals 60. The line arresting insulators 55 are arranged one above another and are coupled together by the engagement of the pin 58 of an upper arresting insulator with the cap 57 of a lower arresting insulator.

In this line arrester, the upper hanger 52 and lower hanger 54 are respectively provided with arcing horns 65 and 66 as shown in FIG. 1. The length of the air gap between the upper and lower arcing horns 65 and 66 is determined so as not to cause flashover between the arcing horns even in the case where a critical discharge current flow through each arresting insulator 55.

When the lightning surge current generated by a lightning strike in the power line 50 is at an expected normal level, the lightning surge current is discharged in the ground, passing through the lower hanger 54, the line arresting insulator string 53, the upper hanger 52 and the arm 51. At this time the lightning surge current passes the pin 58, wire 63, varistors 57, wire 62 and cap 57 of each arresting insulator 55 in the line arresting insulator string 53. After discharging the lightning surge current, the varistors 57 suppress or cut off the follow current to thereby prevent ground faults of the power line.

When the lightning surge current generated in the power line 50 is so large as to exceed the critical discharge current of the varistors 59, this lightning surge current will unavoidably break the varistors 59. The destruction of the varistors 59 causes an arc generated by the follow current to run through the bore hole 56*c*. This arc induced by follow-current is directed outward by the arc guides 64 and is promptly led to a region between both arcing horns 65 and 66.

The conventional line arrester, however, is designed on the assumption that the varistors 59 will inevitably be broken by an excessive lightning surge current which is greater than the design value. To recover the permanently grounded state and supply electricity, therefore, it is necessary to replace all the broken arresting insulators with proper ones. Since the replacement of the insulators takes time, it is difficult to quickly restore the power transmission system. In addition, this job increases the repairing cost required at the restoring time.

When the varistors 59 are broken as mentioned above, arc indused by the follow-current should move such that it runs between the arcing horns 65 and 66 through the arc guides 64. However, the distances between the individual arcing horns 65 and 66 and their associated arc guides 64 are set very large in the conventional line arresting insulator, making it difficult to lead the arc towards the arcing horns 65 and 66. It is noted that if the arc generated by the follow-current continues running along the outer surface of the insulator string, it burns out the line arresting insulator string 53. In the worst case, the arresting insulator string 53 may be cut off at some point. In such a case, the line arrester can no longer support the power line 50.

SUMMARY OF THE INVENTION

Accordingly, it is a primary objective of the present invention to provide a line arrester which can surely cause lightning surge currents that exceed the capability of the varistors incorporated in an arresting insulator to flashover between arcing horns, thereby preventing the varistors from being broken by the lightning surge current.

It is another objective of the present invention to provide a line arrester which can promptly lead an arc generated by a follow-current to arcing horns in order to prevent flashover along the surface of a line arresting insulator string.

To achieve the foregoing and other objects and in accordance with the purpose of the present invention, an improved line arrester is provided for connecting a power transmission line to a tower in an insulated state and discharging a lightning surge current generated in the power line by a lightning strike. The line arrester has a line side and an earth side. A resistor is provided between the earth side and the line side of the line arrester. The resistor has a non-linear voltage-current characteristic, whereby the resistor serves to discharge the lightning surge current to the earth side and cut off a follow current following the lightning surge current based on an operational voltage of the power line. A pair of arcing horns are respectively provided on the earth side and the line side, with an aerial discharge gap being provided therebetween. The aerial discharge gap is in electrical parallel with the resistor. The length of the aerial discharge gap is selected such that flashover does not occur in response to a current smaller than a rated discharge current of the resistor, yet flashover does occur in response to a current that is greater than the rated discharge current, but lower than a critical discharge current of the resistor. With this arrangement the resistor is protected against the lightning surge current greater than the critical discharge current.

It is preferable that each arcing horn has a bent portion in an intermediate portion thereof and that the individual bent portions are arranged close to opposite end portions of the resistor.

BRIEF DESCRIPTION OF THE DRAWINGS

The invention, together with the objects and advantages thereof, may best be understood by reference to the following description of the presently preferred embodiments together with the accompanying drawings in which:

FIG. 3 is a front view of the line arrester, FIG. 4 is a side view of the line arrester shown in FIG. 3, FIG. 5 is an enlarged partially cutaway view of a line arresting insulator shown in FIG. 3, FIG. 6 is a graph showing the relationship between a lightning surge discharge current and the cumulative fault rate, FIG. 7 is a graph showing the relationship between the discharge current of a varistor and its discharge voltage, and FIG. 8 is a graph showing the relationship between the discharge voltage and the length of the aerial discharge gap that will cause flashover with the probability of 50%;

DETAILED DESCRIPTION OF THE PREFERRED EMBODIMENTS

(First Embodiment)

Figure 1:
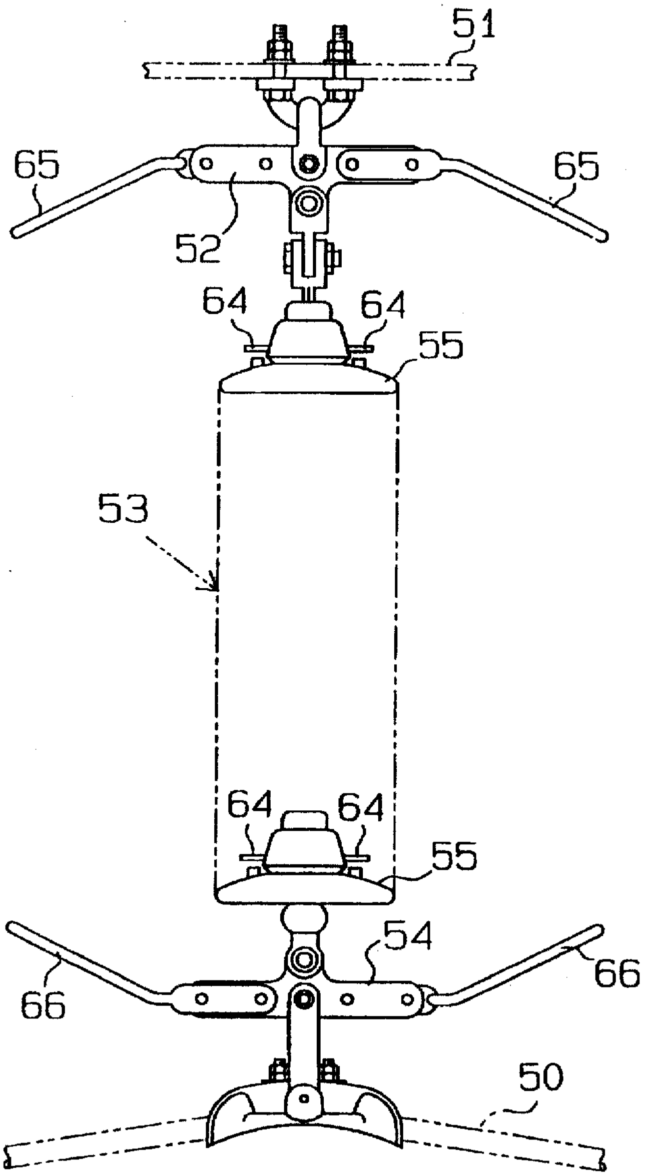
Fig. 1 (PRIOR ART)
FIG. 1 is a front view of a conventional line arrester.
Figure 2:
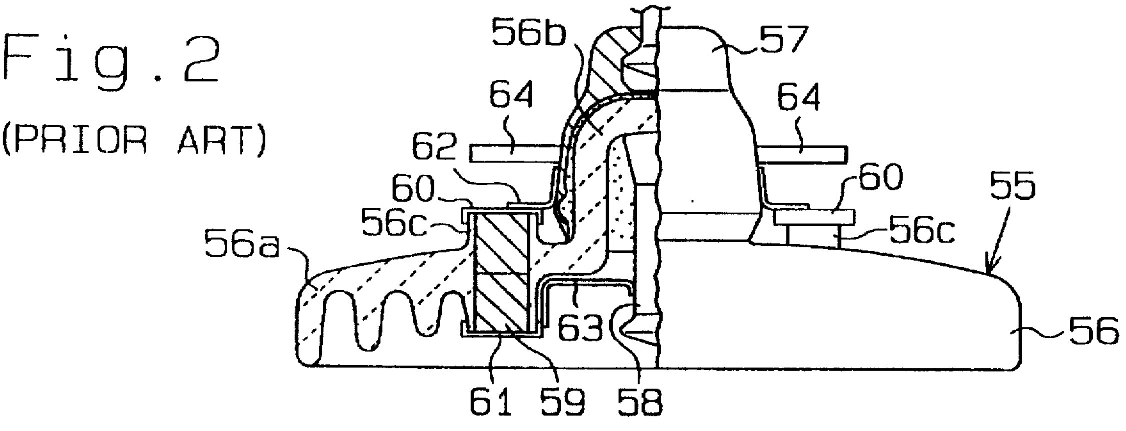
Fig. 2 (PRIOR ART)
FIG. 2 is a partially cutaway view of an arresting insulator shown in FIG. 1.
Figure 3:
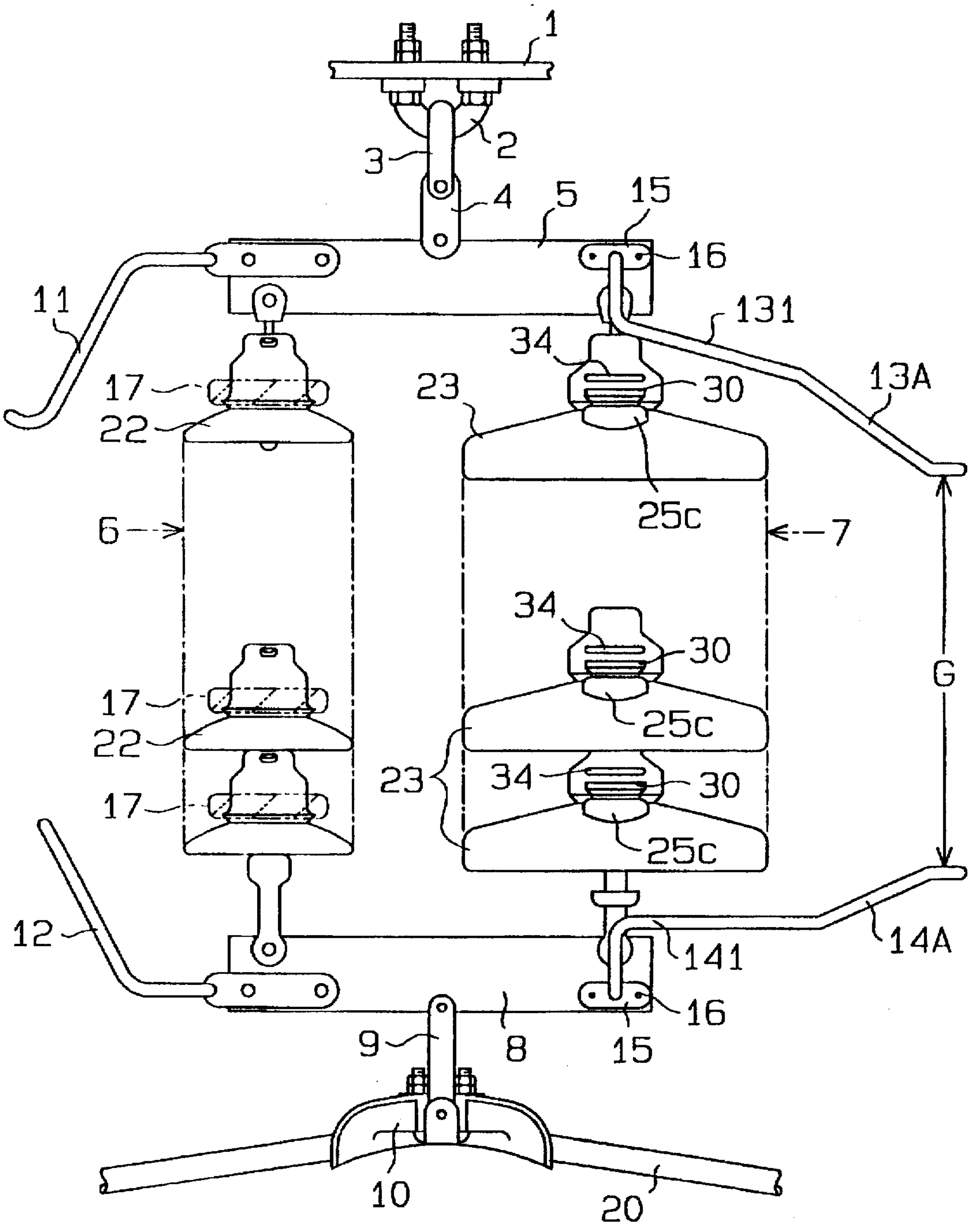
FIGS. 3 through 8 illustrate a line arrester according to a first embodiment of the present invention.

The first embodiment of the present invention will now be described referring to FIGS. 3 through 8. As shown in FIG. 3, a metal hanger 2 is secured to a tower arm 1. An earth side yoke 5 is supported horizontally on the hanger 2 via a connector 3 and a clevis eye 4.

A normal type insulator string 6 constructed by linking a plurality of suspended insulators 22 in series is hung from the left end portion of the yoke 5. Hung from the right end portion of the yoke 5 is a line arresting insulator string 7 constructed by series linking of a plurality of disk-type line arresting insulators 23 that also have an arresting function. Both bottom portions of the insulator strings 6 and 7 are connected by means of a line side yoke 8. A power line 20 is suspended via a connector 9 and a suspension clamp 10 from the center portion of that yoke 8.

Figure 5:
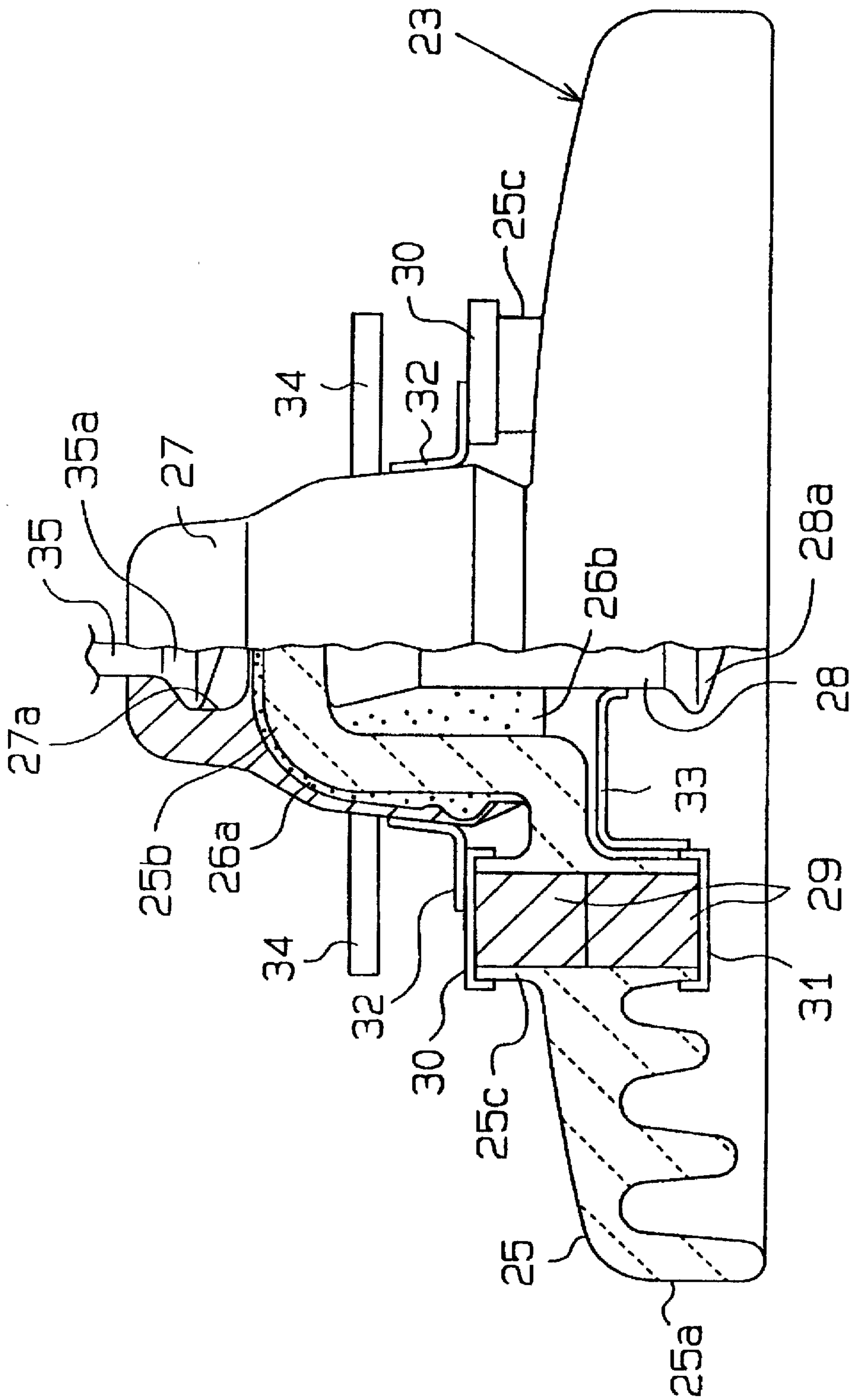

Referring to FIG. 5, the structure of each line arresting insulator 23 will be described below. A body (porcelain shell) 25 of each arresting insulator 23 has a shed 25*a*, a head 25*b* integrally formed on the center top portion of the shed 25*a*, and a pair of bore holes 25*c* formed in the shed 25*a*. The two bore holes 25*c* are located opposite to each other with the insulator head 25*b* in between.

A metal cap 27 is fixed to the top portion of the insulator head 25*a* by cement 26*a*, and a metal pin 28 is secured to the bottom portion of the head 25*a* by cement 26*b*. The cap 27 has a recess 27*a*, and the pin 28 has at its lower end portion an enlarged base 28*a* which is engageable with the inner surface of the recess 27*a*. FIG. 5 shows a pin 35 of an arresting insulator located above this arresting insulator in question. As the enlarged base 35*a* of the pin 35 is fitted in the recess 27*a*, the upper and lower arresting insulators 23 are connected in series.

In each bore hole 25*c* formed in the insulator body 25 are accommodated a plurality of variable resistors (varistors) 29 (two varistors in this embodiment). The varistors 29 are retained in each bore hole 25*c* by an upper seal 30 and a lower seal 31, respectively attached to the upper and lower end sections of that bore hole 25*c*.

Each varistor 29 consists essentially of zinc oxide (ZnO) and has a non-linear voltage-current characteristic. That is, the varistors 29 have such a characteristic as to permit a current to flow therethrough when a high voltage is applied, but hardly allow a current to flow therethrough when a low voltage is applied. The varistors 29 can therefore effectively cut off the following current following the lightning surge current.

The individual upper seals 30 are connected via bonding wires 32 to the cap 27, while the individual lower seals 31 (only one shown) are connected via bonding wires 33 to the pin 28. The cap 27 is provided with a pair of arc guides 34 in association with the upper seals 30.

As shown in FIG. 3, the earth side yoke 5 and the line side yoke 8 are respectively provided with arcing horns 11 and 12. Those arcing horns 11 and 12 are arranged on the side of the insulator string 6. When an excessive voltage is applied between the top and bottom ends of the insulator string 6, flashover occurs between the arcing horns 11 and 12. This prevents flashover from occurring along the outer surface of the insulator string 6, so that the insulator string 6 will not be damaged.

Figure 4:
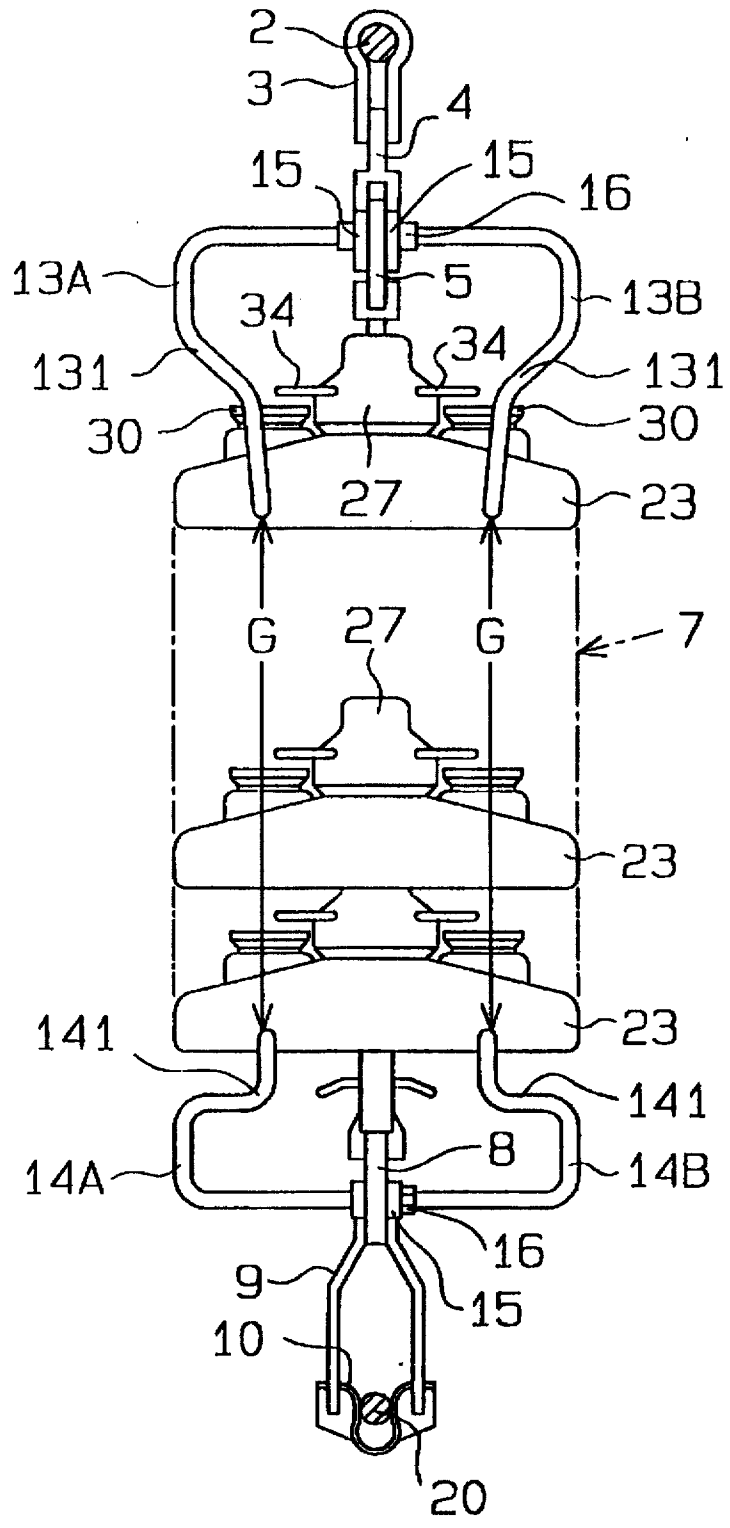

As shown in FIGS. 3 and 4, the earth side yoke 5 is provided with a pair of arcing horns 13A and 13B, and the line side yoke 8 is provided with a pair of arcing horns 14A and 14B. The individual arcing horns 13A, 13B, 14A and 14B are secured to the associated yokes 5 and 8 by securely fastening brackets 15, fixed to the proximal ends of those arcing horns, to the yokes 5 and 8 by means of bolts 16. The upper arcing horns 13A and 13B are arranged to extend sidewards of the line arresting insulator string 7 in association with the lower arcing horns 14A and 14B.

As shown in FIGS. 3 and 4, the earth side arcing horns 13A and 13B each have an inwardly tapered portion 131 at an intermediate portion thereof. The tapered portions 131 are located close to the arc guides 34 of the uppermost line arresting insulator 23 of the line arresting insulator string 7. Likewise, the line side arcing horns 14A and 14B each have an inwardly bent portion 141 at intermediate portions thereof. The bent portions 141 are located close to the lower seals 31 of the lowermost arresting insulator 23 of the arresting insulator string 7.

Further, the free end portions of the individual arcing horns 13A, 13B, 14A and 14B extend rightwards in FIG. 3, in parallel to the power line 20. There are serial discharge gaps G between the free ends of the arcing horns 13A and 14A, and between those of the arcing horns 13B and 14B. How to determine the gaps G will be discussed later.

Balance weights 17 are fitted over the caps of individual insulators 22 constituting the insulator string 6 to balance the weights of the insulator string 6 and the line arresting insulator string 7, thereby keeping the yokes 5 and 8 horizontal. The power line 20 is suspended from a tower by the line arrester having the above structure.

The maximum current that the varistors 29 of the line arresting insulator string 7 can discharge is called a critical discharge current $I_{max}$. The current at which the varistors 29 generally discharge is called a rated discharge current $I_r$.

The critical discharge current $I_{max}$ and rated discharge current $I_r$ differ depending on the voltage classes of the power line 20. When the voltage class of the power line 20 is specified, however, the critical discharge current $I_{max}$ and rated discharge current $I_r$ of the line arresting insulator string 7 which should be used for the power line 20 having that specific voltage class can be determined theoretically or experimentally.

When the lightning surge current generated in the power line 20 is at most a current ($I_{max}-\Delta I$) slightly lower than the critical discharge current $I_{max}$, the lightning surge current is discharged to the ground through the line arresting insulator string 7. More specifically, the lightning surge current is guided from the connector 9, through the yoke 8 to the pin 28 of the lowermost arresting insulator 23 of the arresting insulator string 7. The surge current is than led through the wire 33, the lower seal 31, the varistors 29, the upper seal 30 and the wire 32, and is transferred from the cap 27 to the pin 35 of the arresting insulator 23 directly above the first insulator. The surge passes through the remaining insulator by following a similar course until it reaches the cap 27 of the uppermost arresting insulator 23 of the arresting insulator string 7. It then runs from the cap 27 through the yoke 5, the connector 3, the hanger 2 and the tower arm 1, and is discharged in the ground.

Upon application of this lightning surge voltage, the individual varistors 29 rapidly reduce their resistance to pass the lightning surge current therethrough. In accordance with the reduction of the applied voltage due to the discharging of the lightning surge current in the ground, the individual varistors 29 restore their resistances to recover the insulation. As a result, the follow current originating from the operational voltage is suppressed and cut off, restoring the power line 20 into the normal operational state.

On the other hand, when the lightning surge current generated in the power line 20 exceeds the critical discharge current $I_{max}$ of the line arresting insulator string 7, the lightning surge current is discharged in the ground through the spaces between the arcing horns 14A and 13A and between 14B and 13B. In this case, excessive lightning surge current does not flow through the arresting insulator string 7, thereby protecting the varistors 29 of the arresting insulator string 7 against damage caused by lightning strikes.

The flashover caused between the upper and lower arcing horns generate a ground fault in the power line. This ground fault can however be cleared by tripping (opening) the breaker in a substation. Closing of the breaker again after the tripping will quickly restart the power transmission.

A description will now be given regarding provision of the aerial discharge gap G for causing flashover of the lightning surge current between the arcing horns when the lightning surge current generated in the power line 20 exceeds a current ($I_{max}-\Delta I$) slightly lower than the critical discharge current $I_{max}$ of the arresting insulator string 7 as described above, referring to specific line voltage classes.

Figure 6:
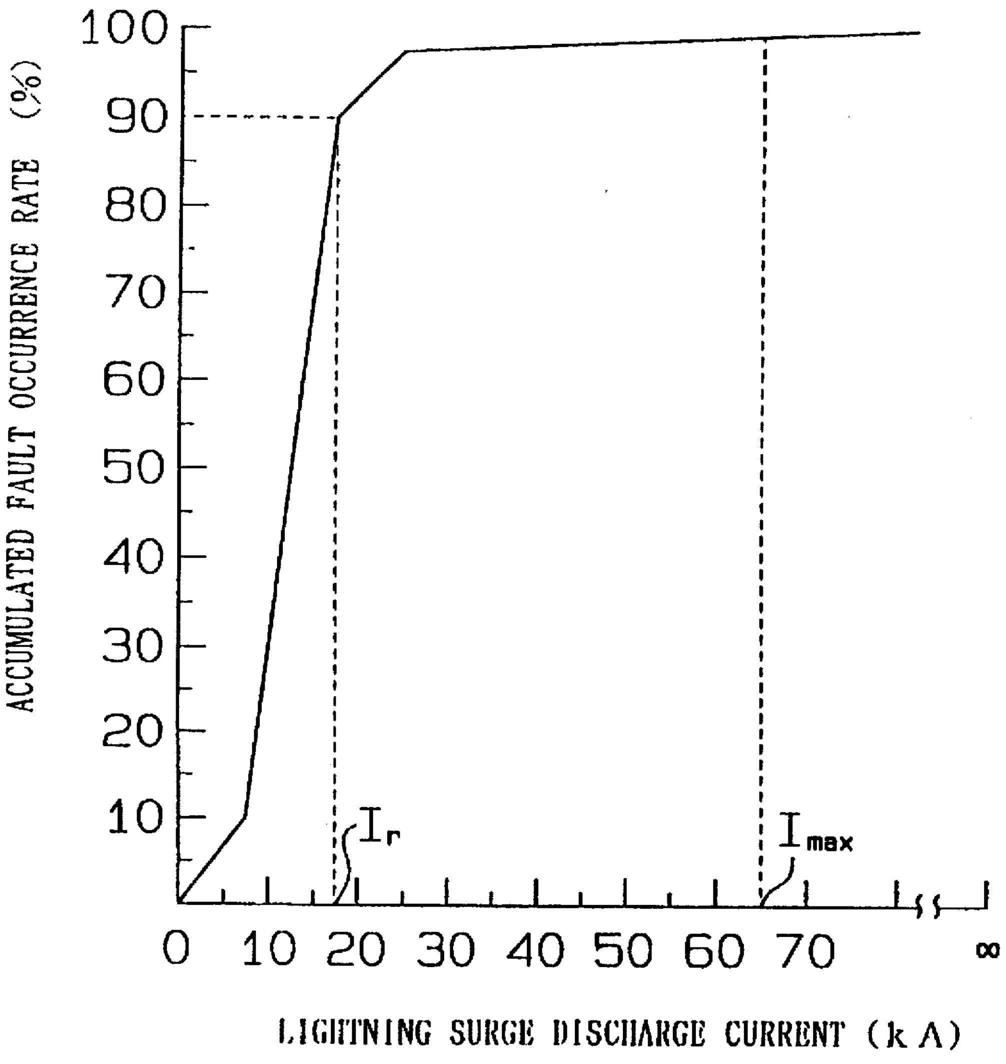

FIG. 6 shows the relationship between the lightning surge discharge current and the rate of occurrence of faults in a power line due to this lightning surge current in the case where the line voltage class is between 66 kV and 77 kV. It is to be noted that the rate of occurrence of faults in FIG. 6 is expressed by accumulated values which vary according to an increase in lightning surge discharge current.

The graph shows that when the lightning surge discharge current of the arresting insulator string 7 becomes equal to the rated discharge current $I_r$ or greater ($I_r$ is set to 17 kA in this case), the accumulated rate of faults occurred by lightning exceeds 90%. In the range where the lightning surge discharge current is greater than the critical discharge current $I_{max}$ ($I_{max}$ is set to 65 kA in this case), the inclination of the graph is close to zero.

It is apparent from the above that few lightning faults will occur at lightning currents that are higher than the critical discharge current $I_{max}$. It is at those excessive current levels that the probability of the varistors 29 being damaged is the highest. Rather, most lightning faults occur at lightning currents that are below the rated discharge current $I_r$. Therefore, even if the line arrester is designed so that lightning surge currents that correspond to the critical discharge current $I_{max}$ are not discharged by the arresting insulator string 7, the arrester will prevent most lightning faults.

Figure 7:
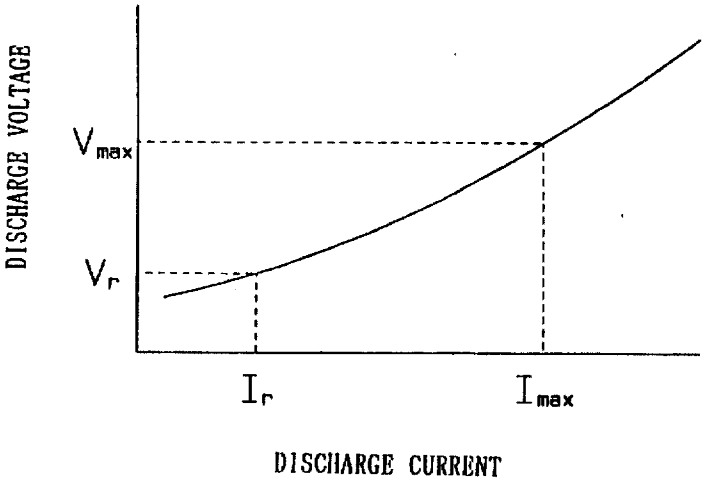

For the discussion below, the discharge voltage of the line arresting insulator string 7 that corresponds to the rated discharge current $I_r$ will be denoted by $V_r$. The discharge voltage corresponding to the critical discharge current $I_{max}$ is denoted by $V_{max}$. FIG. 7 illustrates the relationship between the discharge current I of the arresting insulator string 7 according to this embodiment and the discharge voltage V. In this embodiment the characteristic of the arresting insulator string 7 is so determined that the ratio of the discharge voltage $V_r$ to the discharge voltage $V_{max}$ satisfies the following equation (1).

$$1.3 \leq (V_{max}/V_r) \quad (1)$$

With the line voltage being 66 kV, the discharge voltage $V_{max}$ is 350 kV when the line arrester operates on the critical discharge current $I_{max}$. The discharge voltage $V_r$ when the line arrester operates on the rated discharge current $I_r$ is therefore 1/1.3 of $V_{max}$ (350 kV) or smaller, i.e., 269 kV or below.

Figure 8:
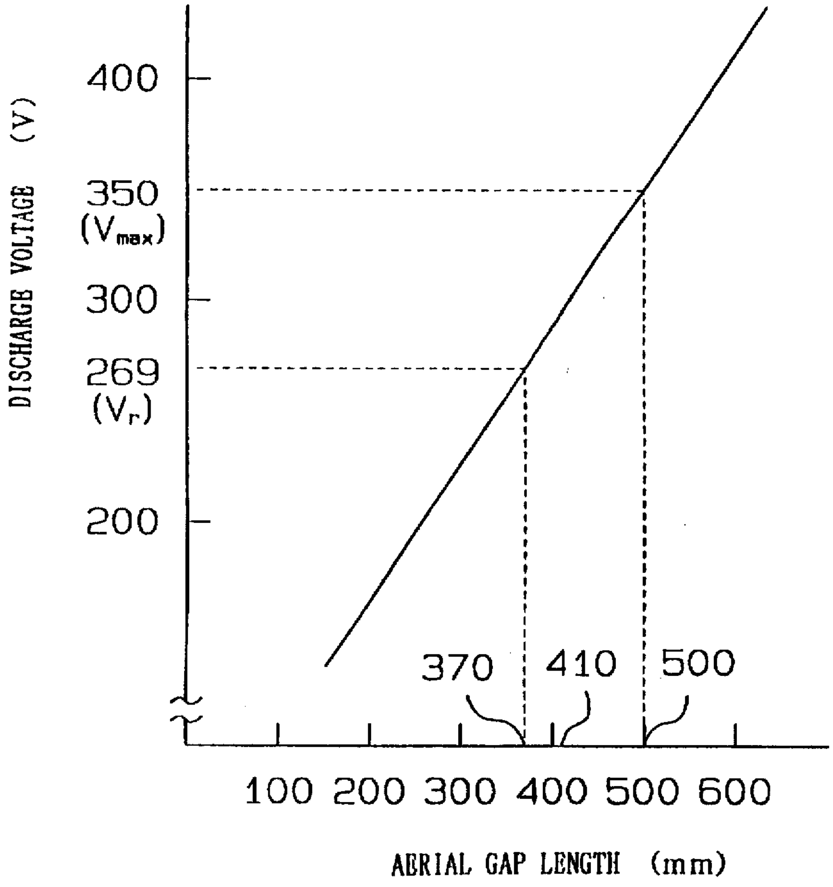

FIG. 8 shows the relationship between the length L of the aerial discharge gap G which causes the flashover with the probability of 50%, and the discharge voltage V. This relation was verified by experiments. As should be apparent from FIG. 8, when the discharge voltage is 269 kV or below, the gap length for 50% flashover is 370 mm or shorter; whereas with the discharge voltage being 350 kV, the gap length for 50% flashover is 500 mm. In order to prevent ground faults by lightning without causing flashover in the aerial discharge gap G with application of a voltage in the vicinity of the discharge voltage $V_r$, therefore, the length L of the aerial discharge gap should be set in the range of 370 and 500 mm.

In this embodiment, the gap length L is 410 mm (82% of 500 mm and 111% of 370 mm). With this gap length (L=410 mm), the probability that flashover would occur with the discharge voltage being $V_{max}$ (=350 kV) is at least 99%, which means that flashover is very likely to occur in the aerial discharge gap G when $V_{max}$ is applied. Further, with the discharge voltage being $V_r$ (=269 kV), the probability of occurrence of flashover is at most 0.1%, almost surely preventing ground faults from occurring due to the lightning strike.

According to this embodiment, the tapered portions 131 of the arcing horns 13A and 13B are located close to the upper end portions of the bore holes 25c of the uppermost line arresting insulator 23 to retain the varistors 29, and the bent portions 141 of the arcing horns 14A and 14B close to the lower end portions of the bore holes 25c of the lowermost line arresting insulator 23. Even if the varistors 29 are broken by excessive lightning, the arc generated by the follow current is promptly caught by the tapered and bent portions 131 and 141.

The caught arc is led to between the free end portions of the upper and lower arcing horns 13A and 14A and 13B and 14B therealong, causing flashover at a position apart from the line arresting insulator string 7. This prevents flashover from occurring along the outer surface of the line arresting insulator string 7. Further, the aerial discharge gap between the upper and lower arcing horns serve to suppress and cut off the follow current.

(Second Embodiment)

Figure 9:
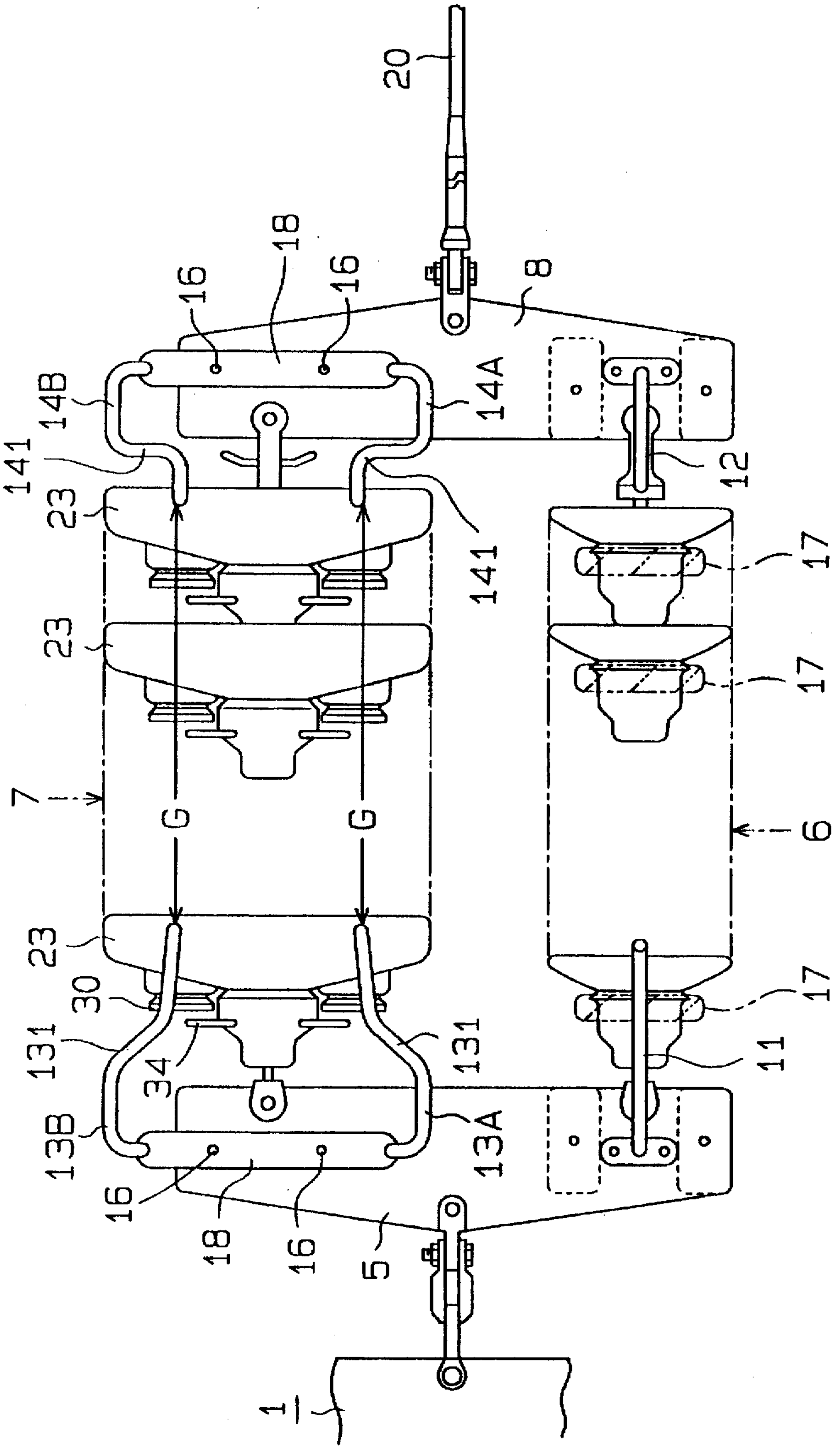
FIG. 9 is a plain view of a line arrester according to a second embodiment of the present invention.
Figure 10:
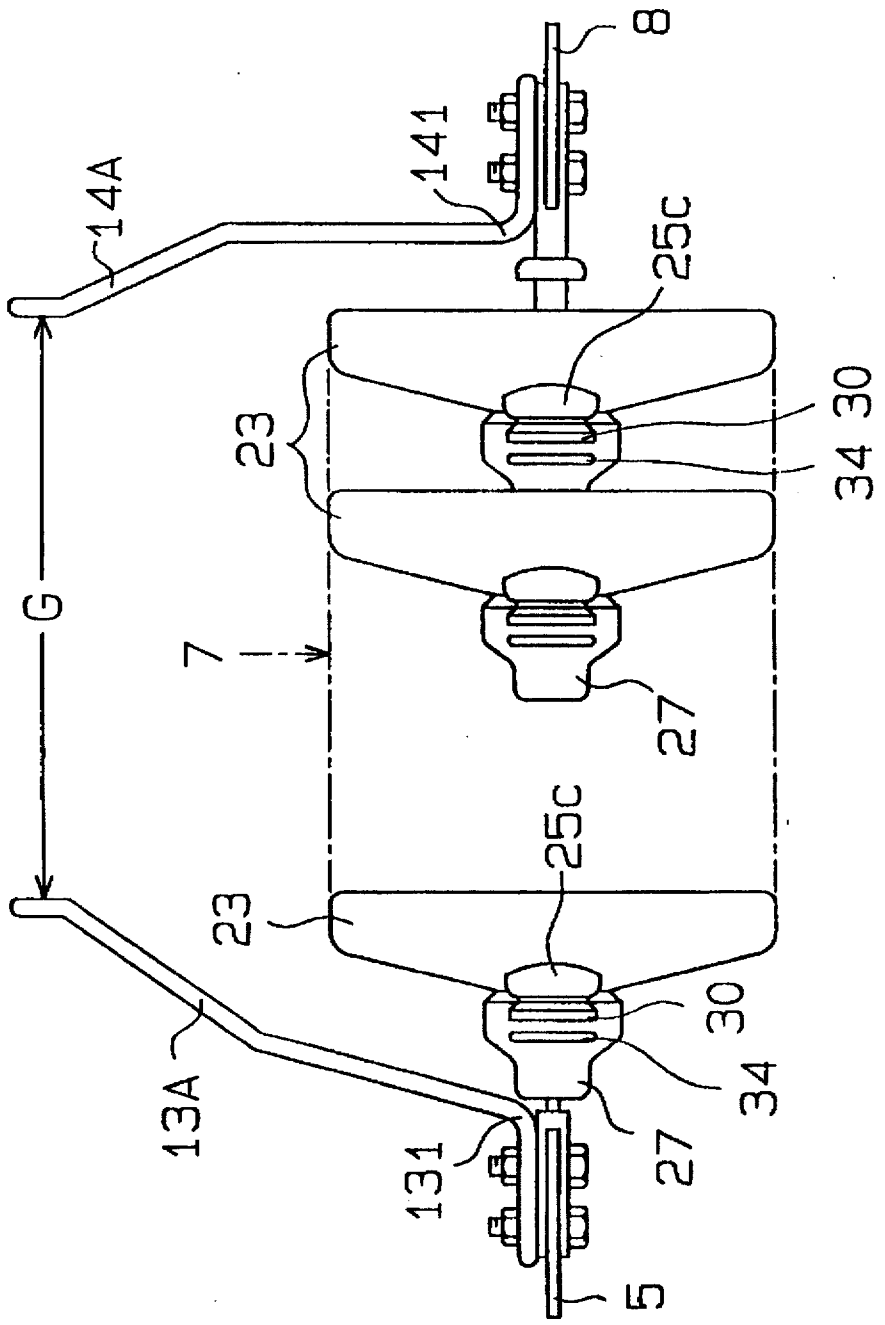
FIG. 10 is a front view of the line arrester shown in FIG. 9.

A description will now be given of the second embodiment where a line arrester embodying the present invention is applied to a strain tower. As shown in FIGS. 9 and 10, a line arrester having almost the same structure as that of the first embodiment is arranged parallel to the ground. A power line 20 is suspended from an arm 1 of the strain tower by this line arrester.

In this embodiment arcing horns 13A, 13B and 14A, 14B are coupled by brackets 18. On the upper side of yokes 5 and 8, tapered portions 131 of the arcing horns 13A, 13B are arranged close to bore holes 25c of the uppermost line arresting insulator 23, and bent portions 141 of the arcing horns 14A, 14B close to bore holes 25c of the lower most arresting insulator 23. The action and advantages of this line arrester are exactly the same as those of the first embodiment.

(Third Embodiment)

Figure 11:
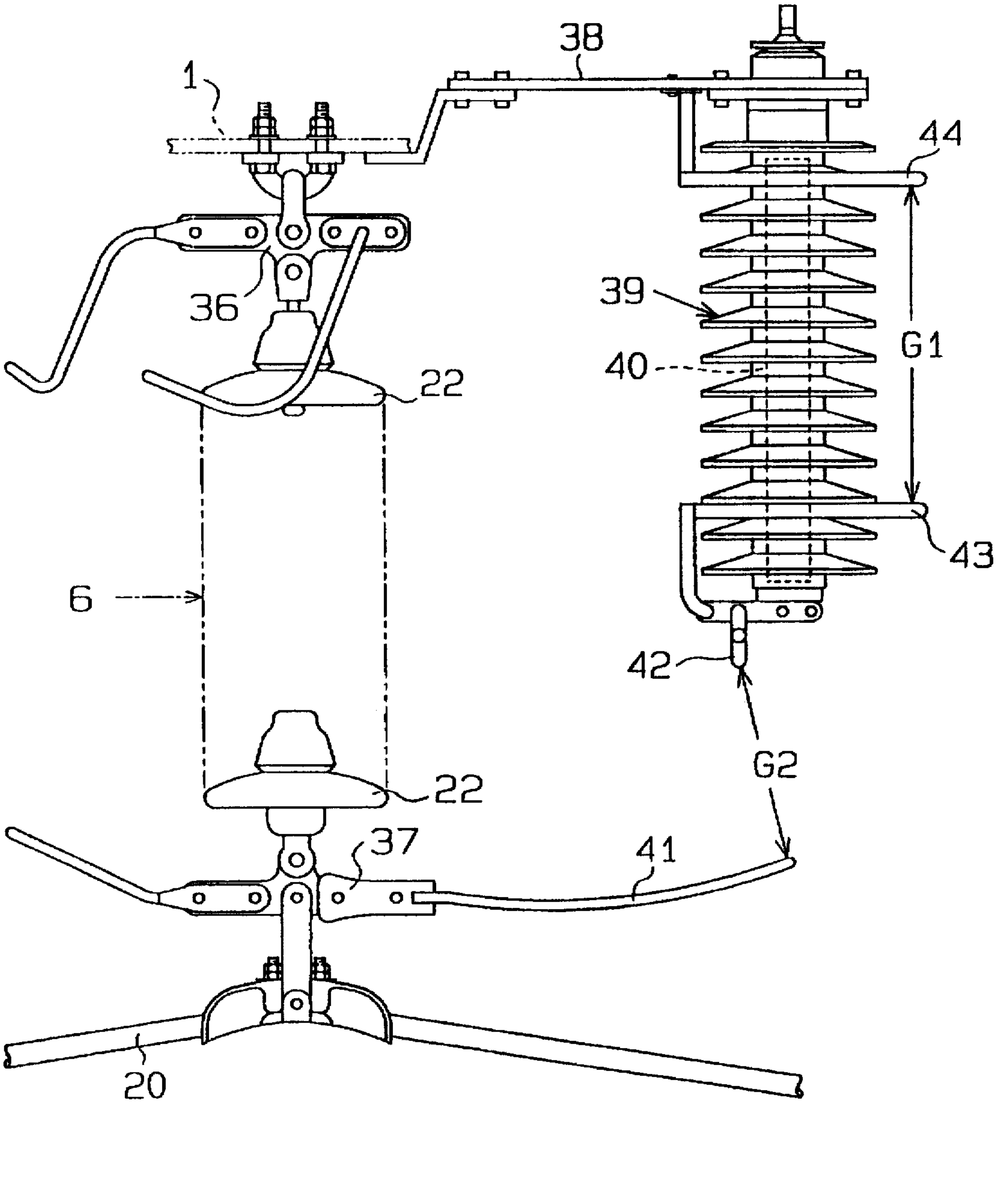
FIG. 11 is a front view of a line arrester according to a third embodiment of the present invention.

A description will now be given of the third embodiment in which a serial discharge gap serial to a line arrester embodying the present invention is added. As shown in FIG. 11, a power line 20 is suspended from a tower arm 1 by an upper hanger 36, a normal suspension insulator string 6 and a lower hanger 37. An adapter 38 is attached to the arm 1. An arresting unit 39 is hung parallel to the insulator string 6 from the adapter 38. This arresting unit 39 has a plurality of insulator bodies with sheds formed integrally, with multiple resistors 40 retained in series in the center portion of the arresting unit 39.

A line side discharge electrode 41 is attached to the lower hanger 37, and an earth side discharge electrode 42 is attached to the bottom portion of the arresting unit 39. A predetermined aerial discharge gap G2 is provided between both electrodes 41 and 42.

Further, a line side arcing ring 43 and an earth side arcing ring 44 are respectively supported at the lower and upper end portions of the arresting unit 39, with an aerial discharge gap G1 provided between both rings 43 and 44. The length of the aerial discharge gap G1 is so determined as to cause flashover by a current slightly lower than the critical discharge current $I_{max}$ determined by the resistors 40 of the arresting unit 39 and not to cause flashover by a current equal to or smaller than the rated discharge current $I_r$ of the resistors 40, as in the first embodiment.

In this embodiment, the lightning surge current generated in the power line 20 is flashed over from the line side electrode 41 to the earth side electrode 42 through the lower hanger 37. Normally, the lightning surge current is discharged to the ground after passing the resistors 40, adapter 38 and arm 1. When the lightning surge current exceeds the critical discharge current $I_{max}$, this lightning surge current is flashed over between both arcing rings 43 and 44 and is discharged to the ground after passing the adapter 38 and arm 1, thereby preventing the resistors 40 from being broken.

Although only three embodiments of the present invention have been described herein, it should be apparent to those skilled in the art that the present invention may be embodied in many other specific forms without departing from the spirit or scope of the invention. In particular, it is to be understood that the present invention may be embodied in a line arrester which couples a power line from a tower arm only by an arresting insulator string and without using a normal insulator string. Therefore, the present examples and embodiments are to be considered as illustrative and not restrictive, and the invention is not to be limited to the details given above, but may be modified within the scope of the appended claims.

What is claimed is:

1. A line arrester for connecting a power transmission line to a tower in an insulated state and discharging a lightning surge current generated in the power transmission line by a lightning strike, the line arrester having a line side and an earth side and comprising:

a first insulator string provided between the earth side and the line side, said first insulator string comprising a plurality of suspended insulators linked in series;

a second insulator string provided between the earth side and the line side, said second insulator string being provided in parallel with respect to said first insulator string and comprising a plurality of line arresting insulators linked in series, each line arresting insulator having at least one resistor having a non-linear voltage-current characteristic and satisfying the equation:

$$1.3 \leq (V_{max}/V_r)$$

where $V_{max}$ is a discharge voltage that corresponds to a critical discharge current and $V_r$ is a discharge voltage that corresponds to a rated discharge current, the rated discharge current being the amount of lightning surge current that results in an accumulated power line fault rate of at least 90%; and a pair of arcing horns respectively provided on the earth side and the line side, each of said arcing horns having bent portions in intermediate portions thereof arranged proximate to opposite ends of said second insulator string, and wherein an aerial discharge gap is provided between the arcing horns and in parallel with a group of resistors in said second insulator string, the aerial discharge gap having a length determined to cause flashover between the arcing horns by a current that is equal to or greater than a critical discharge current, $I_{max}$, of each resistor to protect said group of resistors by preventing a lightning surge current of at least $I_{max}$ from flowing therethrough.

2. A line arrester according to claim 1, wherein the length of the aerial discharge gap between the arcing horns satisfies the equation:

$$L_r \leq L \leq L_{max}$$

where L is the length of the aerial discharge gap between the arcing horns, $L_{max}$ is the length of an aerial discharge gap which causes flashover with a probability of 50% when the discharge voltage is $V_{max}$, and $L_r$ is the length of an aerial discharge gap which causes flashover with a probability of 50% when the discharge voltage is $V_r$.

3. A line arrester according to claim 1, wherein each line arresting insulator includes an insulator body with a bore hole that retains a segment of each said at least one resistor, an arc guide is provided in association with an earth side end portion of the bore hole in the earth side arresting insulator in said second insulator string, the bent portion of the earth side arcing horn is arranged proximate to the arc guide, and the bent portion of the line side arcing horn is arranged proximate to a line side end portion of the bore hole in the line side arresting insulator in said second insulator string.

4. A line arrester according to claim 1, wherein each of said plurality of line arresting insulators retains a segment of each said at least one resistor and the power transmission line is suspended from the tower by said second insulator string.

5. A line arrester according to claim 4, wherein each line arresting insulator includes an insulator body with a bore hole that retains a segment of each said at least one resistor, an arc guide is provided in association with an earth side end portion of the bore hole in the earth side arresting insulator in said second insulator string, the bent portion of the earth side arcing horn is arranged proximate to the arc guide, and the bent portion of the line side arcing horn is arranged proximate to a line side end portion of the bore hole in the line side arresting insulator in said second insulator string.

6. A line arrester according to claim 1, wherein when a lightning surge current generated in the power transmission line by a lightning strike is smaller than a rated discharge current, $I_r$, set to 17 kA, the lightning surge current is discharged to the ground via resistors in said second insulator string, and when a lightning surge current generated in the power transmission line by a lightning strike is equal to or greater than a critical discharge current, $I_{max}$, set to 65 kA, the lightning surge current is discharged to the ground via the aerial discharge gap between the arcing horns.

7. A line arrester according to claim 6, wherein each line arresting insulator includes an insulator body with a bore hole that retains a segment of each said at least one resistor, an arc guide is provided in association with an earth side end portion of the bore hole in the earth side arresting insulator in said second insulator string, the bent portion of the earth side arcing horn is arranged proximate to the arc guide, and the bent portion of the line side arcing horn is arranged proximate to a line side end portion of the bore hole in the line side arresting insulator in said second insulator string.

8. A line arrester according to claim 1, further comprising an arresting unit that contains each said at least one resistor.

9. A line arrester according to claim 8, further comprising a line side discharge electrode and an earth side discharge electrode provided at one end portion of the arresting unit, there being an aerial discharge gap provided between the earth side and line side discharge electrodes, the aerial discharge gap being in electrical series with each said at least one resistor retained in the arresting unit.

10. A line arrester according to claim 8, wherein each line arresting insulator includes an insulator body with a bore hole that retains a segment of each said at least one resistor, an arc guide is provided in association with an earth side end portion of the bore hole in the earth side arresting insulator in said second insulator string, the bent portion of the earth side arcing horn is arranged proximate to the arc guide, and the bent portion of the line side arcing horn is arranged proximate to a line side end portion of the bore hole in the line side arresting insulator in said second insulator string.

11. A line arrester for connecting a power transmission line to a tower in an insulated state and discharging a lightning surge current generated in the power transmission line by a lightning strike, the line arrester having a line side and an earth side and comprising:

- a first insulator string provided between the earth side and the line side, said first insulator string comprising a plurality of suspended insulators linked in series;
- a second insulator string provided between the earth side and the line side, said second insulator string being provided in parallel with respect to said first insulator string and comprising a plurality of line arresting insulators linked in series, each line arresting insulator having at least one resistor having a non-linear voltage-current characteristic and satisfying the equation:

$$1.3 \leq (V_{max}/V_r)$$

where $V_{max}$ is a discharge voltage that corresponds to a critical discharge current and $V_r$ is a discharge voltage that corresponds to a rated discharge current, the rated discharge current being the amount of lightning surge current that results in an accumulated power line fault rate of at least 90%; and

- a pair of arcing horns respectively provided on the earth side and the line side, with an aerial discharge gap being provided between the arcing horns and in parallel with a group of resistors in said second insulator string, the aerial discharge gap having a length determined to cause flashover between the arcing horns by a current that is equal to or greater than a critical discharge current, $I_{max}$, of each resistor to protect said group of resistors by preventing a lightning surge current of at least $I_{max}$ from flowing therethrough, wherein when a lightning surge current generated in the power transmission line by a lightning strike is smaller than a rated discharge current, $I_r$, set to 17 kA, the lightning surge current is discharged to the ground via resistors in said second insulator string, and when a lightning surge current generated in the power transmission line by a lightning strike is equal to or greater than a critical discharge current, $I_{max}$, set to 65 kA, the lightning surge current is discharged to the ground via the aerial discharge gap between the arcing horns.

12. A line arrester according to claim 11, wherein the length of the aerial discharge gap between the arcing horns satisfies the equation:

$$L_r \leq L \leq L_{max}$$

where L is the length of the aerial discharge gap between the arcing horns, $L_{max}$ is the length of an aerial discharge gap which causes flashover with a probability of 50% when the discharge voltage is $V_{max}$, and $L_r$ is the length of an aerial discharge gap which causes flashover with a probability of 50% when the discharge voltage is $V_r$.

13. A line arrester according to claim 11, wherein each of said plurality of line arresting insulators retains a segment of each said at least one resistor and the power transmission line is suspended from the tower by said second insulator string.

14. A line arrester according to claim 11, further comprising an arresting unit that contains each said at least one resistor.

15. A line arrester according to claim 14, further comprising a line side discharge electrode and an earth side discharge electrode provided at one end portion of the arresting unit, there being an aerial discharge gap provided between the earth side and line side discharge electrodes, the aerial discharge gap being in electrical series with each said at least one resistor retained in the arresting unit.

16. A line arrester for connecting a power transmission line to a tower in an insulated state and discharging a lightning surge current generated in the power transmission line by a lightning strike, the line arrester having a line side and an earth side and comprising:

a first insulator string provided between the earth side and the line side, said first insulator string comprising a plurality of suspended insulators linked in series;

a second insulator string provided between the earth side and the line side, said second insulator string being provided in parallel with respect to said first insulator string and comprising a plurality of line arresting insulators linked in series, each line arresting insulator having at least one resistor having a non-linear voltage-current characteristic and satisfying the equation:

$$1.3 \leqq (V_{max}/V_r)$$

where $V_{max}$ is a discharge voltage that corresponds to a critical discharge current and $V_r$ is a discharge voltage that corresponds to a rated discharge current, the rated discharge current being the amount of lightning surge current that results in an accumulated power line fault rate of at least 90%; and an arresting unit that contains each of said at least one resistor; and a pair of arcing horns respectively provided on the earth side and the line side, with an aerial discharge gap being provided between the arcing horns and in parallel with a group of resistors in said second insulator string, the aerial discharge gap having a length determined to cause flashover between the arcing horns by a current that is equal to or greater than a critical discharge current, $I_{max}$, of each resistor to protect said group of resistors by preventing a lightning surge current of at least $I_{max}$ from flowing therethrough.

17. A line arrester according to claim 16, wherein the length of the aerial discharge gap between the arcing horns satisfies the equation:

$$L_r \leqq L \leqq L_{max}$$

where L is the length of the aerial discharge gap between the arcing horns, $L_{max}$ is the length of an aerial discharge gap which causes flashover with a probability of 50% when the discharge voltage is $V_{max}$, and $L_r$ is the length of an aerial discharge gap which causes flashover with a probability of 50% when the discharge voltage is $V_r$.

18. A line arrester according to claim 16, wherein each of said plurality of line arresting insulators retains a segment of each said at least one resistor and the power transmission line is suspended from the tower by said second insulator string.

19. A line arrester according to claim 18, further comprising a line side discharge electrode and an earth side discharge electrode provided at one end portion of the arresting unit, there being an aerial discharge gap provided between the earth side and line side discharge electrodes, the aerial discharge gap being in electrical series with each said at least one resistor retained in the arresting unit.

20. A line arrester for connecting a power transmission line to a tower in an insulated state and discharging a lightning surge current generated in the power transmission line by a lightning strike, the line arrester having a line side and an earth side and comprising:

a first insulator string provided between the earth side and the line side, said first insulator string comprising a plurality of suspended insulators linked in series;

a second insulator string provided between the earth side and the line side, said second insulator string being provided in parallel with respect to said first insulator string and comprising a plurality of line arresting insulators linked in series, each line arresting insulator having at least one resistor having a non-linear voltage-current characteristic and satisfying the equation:

$$1.3 \leqq (V_{max}/V_r)$$

where $V_{max}$ is a discharge voltage that corresponds to a critical discharge current and $V_r$ is a discharge voltage that corresponds to a rated discharge current, the rated discharge current being the amount of lightning surge current that results in an accumulated power line fault rate of at least 90%; and a pair of arcing horns respectively provided on the earth side and the line side, with an aerial discharge gap being provided between the arcing horns and in parallel with a group of resistors in said second insulator string, the aerial discharge gap having a length determined to cause flashover between the arcing horns by a current that is equal to or great than a critical discharge current, $I_{max}$, of each resistor to protect said group of resistors by preventing a lightning surge current of at least $I_{max}$ from flowing therethrough, and wherein each of said plurality of line arresting insulators retains a segment of each said at least one resistor and the power transmission line is suspended from the tower by said second insulator string.

21. A line arrester according to claim 20, wherein the length of the aerial discharge gap between the arcing horns satisfies the equation:

$$L_r \leqq L \leqq L_{max}$$

where L is the length of the aerial discharge gap between the arcing horns, $L_{max}$ is the length of an aerial discharge gap which causes flashover with a probability of 50% when the discharge voltage is $V_{max}$, and $L_r$ is the length of an aerial discharge gap which causes flashover with a probability of 50% when the discharge voltage is $V_r$.

* * * * *